(12) United States Patent
Baranton et al.

(10) Patent No.: US 12,235,520 B2
(45) Date of Patent: Feb. 25, 2025

(54) METHOD AND SYSTEM FOR PREDICTING AN EYE GAZING PARAMETER AND AN ASSOCIATED METHOD FOR RECOMMENDING VISUAL EQUIPMENT

(71) Applicant: Essilor International, Charenton-le-Pont (FR)

(72) Inventors: Konogan Baranton, Charenton-le-Pont (FR); Aurélie Le Cain, Charenton-le-Pont (FR); Sébastien Fricker, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 788 days.

(21) Appl. No.: 17/424,370

(22) PCT Filed: Jan. 16, 2020

(86) PCT No.: PCT/EP2020/051030
§ 371 (c)(1),
(2) Date: Jul. 20, 2021

(87) PCT Pub. No.: WO2020/156823
PCT Pub. Date: Aug. 6, 2020

(65) Prior Publication Data
US 2022/0113563 A1   Apr. 14, 2022

(30) Foreign Application Priority Data

Jan. 28, 2019   (EP) .................................... 19305104

(51) Int. Cl.
*G02C 13/00*   (2006.01)
(52) U.S. Cl.
CPC ................................ *G02C 13/005* (2013.01)

(58) Field of Classification Search
CPC .. G02C 13/005; G02B 27/01; G02B 27/0172; G02B 27/04; A61B 3/032
(Continued)

(56) References Cited

U.S. PATENT DOCUMENTS

| 2011/0128223 A1 | 6/2011 | Lashina et al. |
| 2018/0081178 A1 | 3/2018 | Shpunt |
| 2018/0252942 A1 | 9/2018 | Gamliel et al. |

FOREIGN PATENT DOCUMENTS

| AU | 780479 | 3/2005 |
| CN | 102112943 A | 6/2011 |

(Continued)

OTHER PUBLICATIONS

International Search Report for PCT/EP2020/051030 dated Apr. 3, 2020, 4 pages.

(Continued)

*Primary Examiner* — Tuyen Tra
*Assistant Examiner* — Rahman Abdur
(74) *Attorney, Agent, or Firm* — NIXON & VANDERHYE

(57) ABSTRACT

This method for predicting at least one eye gazing parameter of a person wearing visual equipment includes steps of: measuring data of at least two individuals wearing visual equipment, such data including at least head motion parameters and eye gazing parameters of the individuals; measuring head motion parameters of the person in real-life conditions; comparing the head motion parameters of the person with the head motion parameters of the at least two individuals; and predicting the at least one eye gazing parameter of the person at least on the basis of the results of the comparing step and of the eye gazing parameters of the at least two individuals.

20 Claims, 2 Drawing Sheets

(58) Field of Classification Search
USPC .......................................................... 351/209
See application file for complete search history.

(56) References Cited

FOREIGN PATENT DOCUMENTS

| | | |
|---|---|---|
| EP | 1 747 750 | 1/2007 |
| WO | 2015/124574 | 8/2015 |
| WO | 2015/173388 | 11/2015 |

OTHER PUBLICATIONS

Written Opinion of the ISA for PCT/EP2020/051030 dated Apr. 3, 2020, 6 pages.
Extended European Search Report for 19305104.2 dated Jul. 5, 2019, 8 pages.
Office Action issued in Chinese Patent Application No. 202080008138.X dated Oct. 25, 2022.

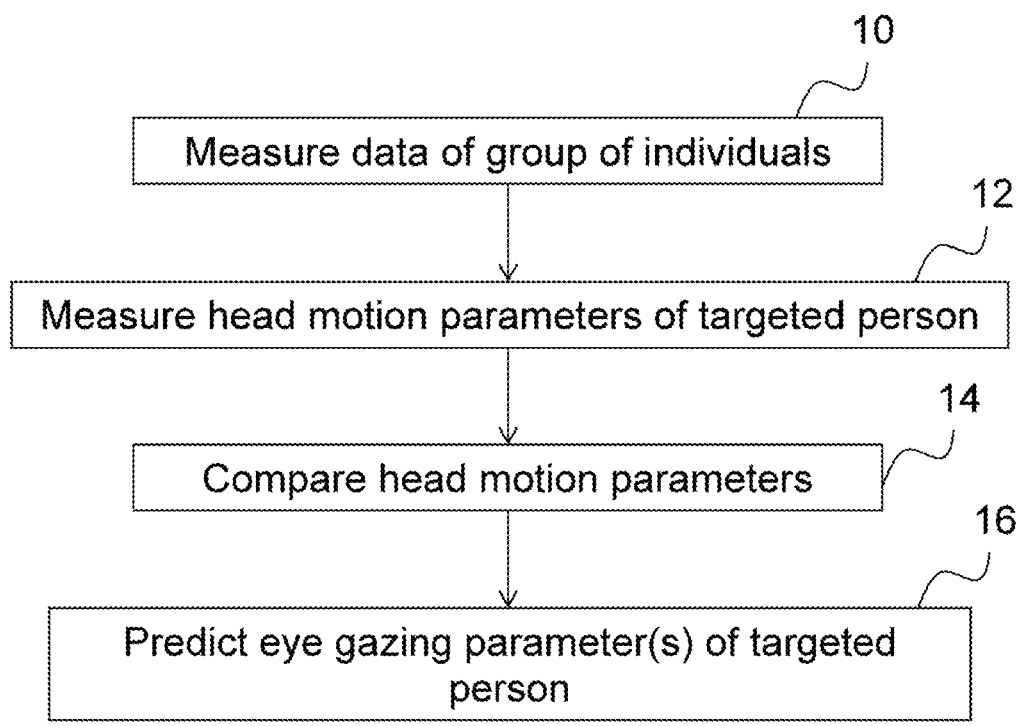
[Fig. 1]
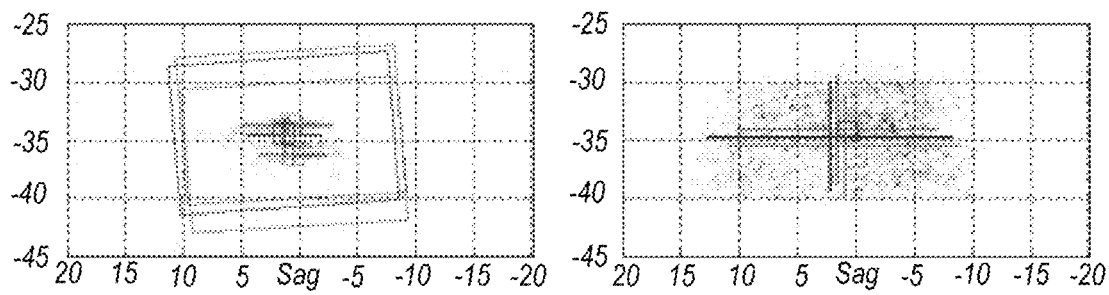
[Fig. 2]

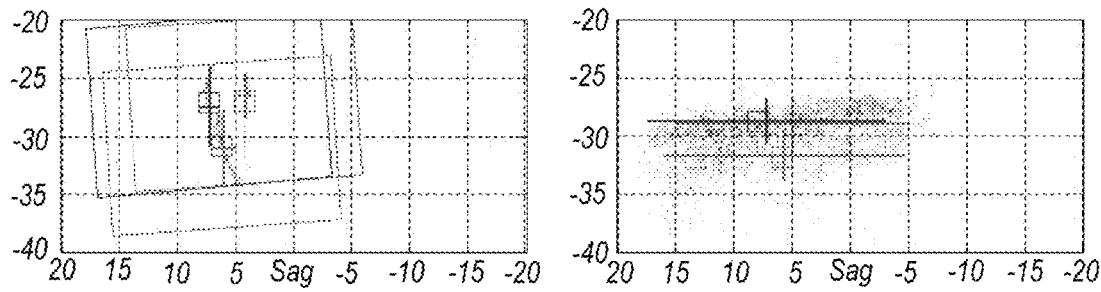
[Fig. 3]
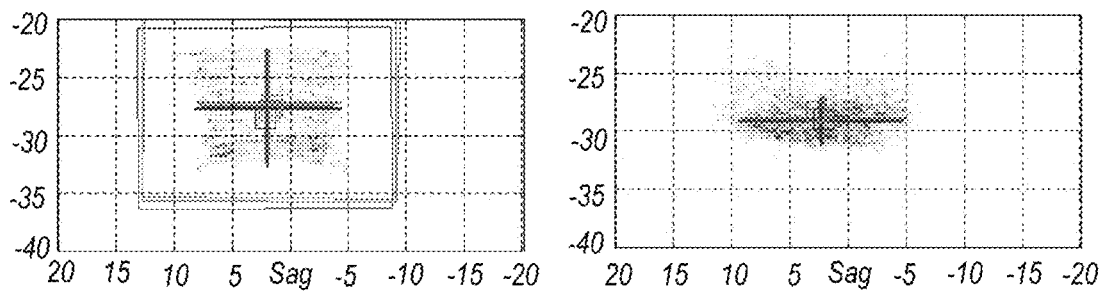
[Fig. 4]
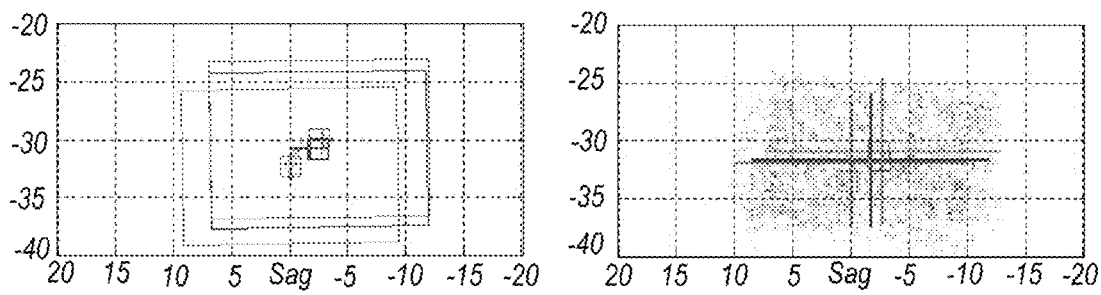
[Fig. 5]

METHOD AND SYSTEM FOR PREDICTING AN EYE GAZING PARAMETER AND AN ASSOCIATED METHOD FOR RECOMMENDING VISUAL EQUIPMENT

CROSS-REFERENCE TO RELATED APPLICATIONS

This application is the U.S. national phase of International Application No. PCT/EP2020/051030 filed Jan. 16, 2020 which designated the U.S. and claims priority to EP 19305104.2 filed Jan. 28, 2019, the entire contents of each of which are hereby incorporated by reference.

FIELD OF THE INVENTION

The present invention relates to a method and system for predicting at least one eye gazing parameter of a person wearing visual equipment. The present invention also relates to an associated method for recommending visual equipment to that person.

BACKGROUND OF THE INVENTION

In order to be as efficient as possible, ophthalmic lenses need to have a design optimized for a given activity or for a set of activities to be performed by the person wearing the ophthalmic lenses.

Such activities may for instance consist in driving, practicing a sport, reading a book, reading on a tablet, working on a laptop, using a mobile telephone or performing a precision task.

The determination of an appropriate ophthalmic lens design is usefully based on the visual exploration strategy used by the wearer when performing the given activity.

Measuring the visual exploration strategy usually requires the use of an eye tracking device. Document WO-A-2015 124574 describes a method for optimizing optical lens equipment for a wearer using such an eye tracking device, mounted on a spectacle frame.

However, eye tracking devices are expensive, fragile, intrusive and complicated to calibrate.

SUMMARY OF THE INVENTION

An object of the invention is to overcome the above-mentioned drawbacks of the prior art.

To that end, the invention provides a method for predicting at least one eye gazing parameter of a person wearing visual equipment, remarkable in that it comprises steps of:
  measuring data of at least two individuals wearing visual equipment, such data comprising at least head motion parameters and eye gazing parameters of the individuals;
  measuring head motion parameters of the above-mentioned person in real-life conditions;
  comparing the head motion parameters of the person with the head motion parameters of the at least two individuals; and
  predicting the at least one eye gazing parameter of the person at least on the basis of the results of the comparing step and of the eye gazing parameters of the at least two individuals.

None of the step of measuring head motion parameters of the above-mentioned person, the comparing step and the predicting step requires any eye tracking device. Thus, the proposed method is economical, simple and robust.

The invention also provides a system for predicting at least one eye gazing parameter of a person wearing visual equipment, remarkable in that it comprises means adapted to perform steps of a method as succinctly described above.

The invention further provides a method for providing visual equipment recommendation to a person, remarkable in that it comprises steps of:
  predicting at least one eye gazing parameter of that person by using a method as succinctly described above; and
  recommending visual equipment to that person according to that at least one eye gazing parameter.

The advantages of the predicting system and of the method for providing visual equipment recommendation are similar to those of the predicting method.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIG. 1 is a flowchart showing steps of a method for predicting at least one eye gazing parameter according to the present invention, in a particular embodiment.

FIG. 2 is a pair of graphs showing respectively the head motion and the eye gazing pattern of an individual reading a book, corresponding to a first visual behavior.

FIG. 3 is a pair of graphs showing respectively the head motion and the eye gazing pattern of an individual reading a book, corresponding to a second visual behavior.

FIG. 4 is a pair of graphs showing respectively the head motion and the eye gazing pattern of an individual reading a book, corresponding to a third visual behavior.

FIG. 5 is a pair of graphs showing respectively the head motion and the eye gazing pattern of an individual reading a book, corresponding to a fourth visual behavior.

DETAILED DESCRIPTION OF THE INVENTION

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

As shown in FIG. 1, in a particular embodiment, a method according to the invention, for predicting at least one eye gazing parameter of a targeted person wearing visual equipment, comprises a first step 10 of measuring data of a group of people.

By way of non-limiting example, the at least one eye gazing parameter may be taken among an average eye gazing direction, a spatial distribution of an eye gazing direction, variations of an eye gazing direction as a function of time, repetitive eye gazing patterns, etc.

The group of people comprises at least two individuals. Advantageously, the group of people comprises a high number of individuals, such as 100 or more.

The measuring step 10 is performed while the individuals of the group are carrying out a predetermined activity. This is the activity for which the at least one eye gazing parameter of the targeted person is to be predicted. By way of non-limiting examples, the activity may be driving, or practicing a sport, or reading a book, or reading on a tablet, or working on a laptop, or using a mobile telephone and/or a smart watch, or performing a precision task.

The measured data comprise at least parameters relating, on one hand, to head motion of each of the individuals of the group as a function of time when they are carrying out the predetermined activity and, on the other hand, to eye gazing parameters of such individuals when they are carrying out the predetermined activity.

In addition, the distance to the objects as a function of time may also be measured, where appropriate, depending on the activity which is carried out by the individuals of the group. For example, if the activity consists in reading a book, or reading on a tablet, or working on a laptop, the distance to the object which is the book or the screen, may be measured as a function of time.

The parameters relating to head motion represent the rotation movements of the head of each of the individuals of the group as a function of time, when the individuals are carrying out the predetermined activity.

The head motion parameters may be measured through a spectacle frame equipped with one or several inertial motion units or IMU or through a spectacle frame equipped with a camera. Each of the individuals of the group will be wearing such a frame while carrying out the predetermined activity.

As a variant, the head motion parameters may be measured via motion capture.

The eye gazing parameter(s) of each of the individuals of the group may be measured through an eye tracking device.

The head motion parameters and the eye gazing parameters are measured during a predetermined period of time for each individual of the group, in order to obtain a set of measured values which is considered to be representative. For example, the predetermined period of time is between 1 and 15 minutes.

Optionally, the eye gazing parameters of the individuals of the group may be assigned a ranking, which is included in the measured data of the individuals. Namely, a low ranking will express one or several problems, such as amblyopia, unadapted visual correction, a too small spectacle frame, etc.

Then, by applying a clustering method such as the K-means method to the head motion parameters and the eye gazing parameters of all the individuals of the group, a plurality of classes or clusters of visual behaviors is determined. A cluster contains head motion parameters that are similar to each other for various individuals of the group and eye gazing parameters that are similar to each other for those individuals.

As a variant, instead of using an automatic clustering method such as the K-means method, the distribution of the measured data into a plurality of clusters may be done manually.

Optionally, the clustering may use additional parameters, such as additional measurements carried out on the individuals of the group in a point of sale of visual equipment, and/or the prescription of each of the individuals, and/or questionnaires answered by the individuals and relating to their respective visual behaviors.

The clusters of visual behaviors may also be determined by using other sensors, such as a sensor measuring the reading distance, or any sensor measuring the wearer's three-dimensional environment.

Each cluster constitutes a visual pattern.

The heat map, giving the locations in the ophthalmic lens through which an individual is gazing, may also be used for determining the various visual behaviors.

By way of non-limiting examples, FIGS. 2 to 5 show four different visual behaviors for the activity of reading a book.

The graphs correspond to the reading of three pages of the book.

The axes of the graphs are the horizontal and vertical angles in degrees with respect to the position of the head when the individual looks at a fixed point located straight ahead. On the abscissa axis, "Sag" refers to the sagittal plane.

The graph on the left of each drawing shows the head motion and the graph on the right of each drawing shows the eye motion.

FIG. 2 illustrates a first visual behavior, with horizontal head motion and vertical eye motion.

FIG. 3 illustrates a second visual behavior, with vertical head motion and horizontal eye motion.

FIG. 4 illustrates a third visual behavior, with large head motion and small eye motion.

FIG. 5 illustrates a fourth visual behavior, with small head motion and large eye motion.

On the basis of the determined visual patterns, a prediction model for the predetermined activity is built, which is a decision tree, using a database in which each set of parameters comprising the measured head motion parameters and possibly other input data for an individual of the group, is associated with the corresponding visual pattern, comprising the eye gazing parameters.

Thus, the prediction model comprises a plurality of clusters of visual behaviors.

The other possible input data comprise for instance the age and gender of the individual.

The prediction of eye gazing parameters of the targeted person may also be done by measuring the head motion parameters and the reading distance for example with an inertial motion unit or IMU and a sensor measuring the reading distance (for instance a time-of-flight sensor) embedded on a frame.

The above-mentioned database can be built either for a single activity carried out by the group of individuals, or for a plurality of activities. In case it is built for a plurality of activities, the set of parameters comprising the measured head motion parameters of an individual also comprises the type of activity this individual has carried out during the measuring step 10.

As shown in FIG. 1, the step following the first measuring step 10 is a second measuring step 12 of measuring the head motion parameters of a targeted person, i.e. a person for which the visual pattern, including the at least one eye gazing parameter, is to be predicted.

The head motion parameters of the targeted person are measured in real-life conditions, i.e. neither in a laboratory, nor in any other supervised environment.

During the second measuring step 12, the head motion parameters of the targeted person may be measured by asking the targeted person to wear a frame equipped with one or several inertial motion units or IMU or equipped with a camera. The head motion parameters measured for the targeted person are the same as for the individuals of the group.

However, according to the invention, it is not necessary to use any eye tracking device for the targeted person, because the at least one eye gazing parameter of the targeted person will be predicted, as described below.

After the measuring step 12, during a comparing step 14, the measured head motion parameters of the targeted person are compared with the measured head motion parameters of the individuals carrying out the same predetermined activity as the targeted person, which are stored in the database.

During the comparing step 14, other parameters such as the age and gender of the targeted person may also be taken into account, if the database has been built by integrating age and gender data of the individuals of each group.

When the head motion parameters of the targeted person are found to be similar to the head motion parameters of an individual belonging to a given cluster stored in the database, and optionally when the age and gender of the targeted person are similar to the age and gender of the individuals of that given cluster, a predicting step 16 predicts the at least one eye gazing parameter of the targeted person as being identical to the eye gazing parameters of that given cluster, pursuant to the prediction model, using the database where the head motion parameters are associated with the eye gazing parameters.

In the prediction model, in addition to the age, gender, activity and measured head motion parameters of the targeted person, other data may be input, such as data coming from objects or sensors other than eye tracking devices. Such data may be available in the GPS (Global Positioning System) of a car, a light sensor, a smartphone, etc.

Thus, in a particular embodiment, during the predicting step 16, the at least one eye gazing parameter may be predicted by further using data relating to the predetermined activity of the individuals of the group and of the targeted person.

For example, if the activity of the individuals of the group and of the targeted person consists in using a mobile telephone and/or a smart watch, the predicting step 16 may further use the inclination angle of the mobile telephone and/or of the smart watch of the individuals of the group and of the targeted person.

In addition, from the measurements of head motion of the targeted person, it may be possible to deduce the activity carried out by the targeted person.

As a first non-limiting example, if the targeted person frequently turns his/her head on the left and on the right to check the presence of other cars in the car mirrors when changing lane, it may be deduced from the head motion measuring step 12 that the activity of the targeted person is driving. Knowing this activity, it is possible to refine the head motion analysis to derive the at least one eye gazing parameter, since in the comparing step 14, only the records for the driving activity stored in the database will be searched for finding similar head motion parameters, in order to select the eye gazing parameter(s) associated with the most similar head motion parameters as being the predicted eye gazing parameter(s) of the targeted person.

As a second non-limiting example, if the IMU arranged on the frame worn by the targeted person detects frequent acceleration and/or motion, it may be deduced that the activity of the targeted person is sport. Thus, in the comparing step 14, only the records relating to a sport activity stored in the database will be searched, such as tennis, football, running, etc., in order to select the eye gazing parameter(s) associated with the most similar head motion parameters as the predicted gazing parameter(s) of the targeted person.

A system for predicting at least one an eye gazing parameter of a person wearing visual equipment according to the invention comprises means adapted to perform the above-mentioned steps of the predicting method.

The system comprises a device for measuring the head motion parameters of the individuals and of the targeted person, such as one or several spectacle frames equipped with one or more IMU or equipped with a camera.

The system also comprises a storing medium for storing the database, as well as means for connecting to the database a spectacle frame equipped with one or more IMU or equipped with a camera, in order to store the measured head motion parameters of the individuals of the group into the database.

For building the database, the system also comprises means for measuring the eye gazing parameters of the individuals of the group, such as an eye tracking device.

Optionally, the system may further comprise a processing apparatus for automatically performing the comparing step 14 and the predicting step 16.

The storing medium and the processing apparatus may be part of a computer device.

The method for predicting at least one eye gazing parameter of a targeted person wearing visual equipment as described above may be used for recommending visual equipment to the targeted person.

Different results may be presented to the targeted person. For instance, it is possible to show him/her a global heat map, showing the most frequent eye gazing direction. As a variant, it is possible to show him/her the projection of the most frequent eye gazing direction on the surface of ophthalmic lenses. It is also possible to show him/her the eye gazing direction depending on the activity carried out, which makes it possible to demonstrate the benefit of having several pairs of glasses, to be used as a function of the activity and to recommend such pairs of glasses.

Depending on the predicted eye gazing parameter(s), an appropriate frame size may be recommended to the targeted person. In the case of active lenses, a particular type of control may be recommended as a function of the predicted eye gazing parameter(s), such as a sport mode and an economic mode.

Moreover, a ranking may be assigned to the eye gazing parameter(s), which may be high, average or low and which evaluates whether the eye gazing is very good, or simply correct, or abnormal, in order to be able to make corresponding recommendations to the targeted person.

For instance, for a targeted person wearing progressive addition lenses, measured head motion for a reading activity may lead to prediction of at least one eye gazing parameter showing that the targeted person lowers his/her eyes too much, which may be a sign of an abnormal use of the lenses, due to bad lens mounting or insufficient addition. In such a case, the assigned ranking will be low. In case of insufficient addition, a recommendation will be made for a new pair of glasses with higher addition.

In some cases, the eye gazing parameter prediction may lead to a recommendation for visual training, for example when it is detected from the predicted eye gazing parameter that the targeted person does not use sufficiently the near vision area of progressive addition lenses.

As another example, it may be detected from the eye gazing parameter prediction that the targeted person moves too much his/her head when looking at a car mirror, which may be a sign of using a too small field of vision. In such a case, the assigned ranking will also be low and visual training will also be recommended.

Referring to the visual behaviors shown in FIGS. 2 to 5, the following recommendations for visual equipment will be made. In the case of FIG. 2, a hard design with an extended near vision area in height will be recommended. In the case of FIG. 3, a soft design with an extended near vision area in width will be recommended. In the case of FIG. 4, a hard design will be recommended. In the case of FIG. 5, a soft design with an extended near vision area in width and in height will be recommended. As known by the skilled person, for progressive lens design, soft and hard designs refer to the amount of blur that is located in the peripheral blending zones, knowing that the front of a progressive lens consists of a complex series of curves and that these curves are blended at the least used sections of the lens, i.e. the peripheral and nasal sections. Hard lenses have a much higher concentration of blending in these zones. Soft lenses increase the blending zones, which spreads them out into the distance and reading portions of the lens.

Although representative processes and articles have been described in detail herein, those skilled in the art will recognize that various substitutions and modifications may be made without departing from the scope of what is described and defined by the appended claims.

The invention claimed is:

1. A method for predicting at least one eye gazing parameter of a person wearing visual equipment, wherein it comprises steps of:
   measuring data of at least two individuals wearing visual equipment, said data comprising at least head motion parameters and eye gazing parameters of said individuals;
   measuring head motion parameters of said person in real-life conditions;
   comparing said head motion parameters of said person with said head motion parameters of said at least two individuals; and
   predicting said at least one eye gazing parameter of said person at least on the basis of the results of said comparing step and of said eye gazing parameters of said at least two individuals.

2. A method according to claim 1, wherein said at least one eye gazing parameter of said person is taken among an average eye gazing direction, a spatial distribution of an eye gazing direction, variations of an eye gazing direction as a function of time and repetitive eye gazing patterns.

3. The method according to claim 2, wherein during said measuring steps, head motion parameters are measured through a spectacle frame equipped with an inertial motion unit or with a camera.

4. The method according to claim 2, wherein said data further comprise the age and gender of said individuals.

5. The method according to claim 2, wherein said predicting step uses a prediction model.

6. The method according to claim 1, wherein during said measuring steps, head motion parameters are measured through a spectacle frame equipped with an inertial motion unit or with a camera.

7. The method according to claim 6, wherein said data further comprise the age and gender of said individuals.

8. The method according to claim 6, wherein said predicting step uses a prediction model.

9. The method according to claim 1, wherein during said step of measuring data of said at least two individuals, head motion parameters are measured by using motion capture.

10. The method according to claim 9, wherein said data further comprise the age and gender of said individuals.

11. The method according to claim 1, wherein said data further comprise the age and gender of said individuals.

12. The method according claim 1, wherein said predicting step uses a prediction model.

13. The method according to claim 12, wherein said prediction model comprises a plurality of clusters of visual behaviors.

14. The method according to claim 1, wherein said measuring steps are carried out when said individuals and said person are performing a predetermined activity.

15. The method according to claim 14, wherein said predetermined activity is driving or practicing a sport or reading a book or reading on a tablet or working on a laptop or using a mobile telephone and/or a smart watch or performing a precision task.

16. The method according to claim 14, wherein during said predicting step, said at least one eye gazing parameter is predicted by further using data relating to said predetermined activity of said individuals and of said person.

17. The method according to claim 16, in which said predetermined activity of said individuals and of said person is using a mobile telephone and/or a smart watch, wherein said predicting step further uses an inclination angle of said mobile telephone and/or of said smart watch.

18. The method according to claim 1, wherein said data of said at least two individuals further comprise a ranking of said eye gazing parameters of said individuals.

19. A system for predicting at least one eye gazing parameter of a person wearing visual equipment, wherein it comprises means adapted to perform steps of a method according to claim 1.

20. A method for providing visual equipment recommendation to a person, wherein it comprises steps of:
   predicting at least one eye gazing parameter of said person by using a method according to claim 1; and
   recommending visual equipment to said person according to said at least one eye gazing parameter.

* * * * *